United States Patent
Waters et al.

[11] Patent Number: 5,822,056
[45] Date of Patent: Oct. 13, 1998

[54] INSPECTION APPARATUS WITH REFRACTOR FOR ILLUMINATING CAN FLANGE

[75] Inventors: William T. Waters, Henrico County; Grover C. Edmonds, Dinwiddie County, both of Va.

[73] Assignee: Reynolds Metals Company, Richmond, Va.

[21] Appl. No.: 534,756

[22] Filed: Sep. 27, 1995

[51] Int. Cl.[6] ............................ G01N 21/00; G01N 21/90
[52] U.S. Cl. ........................ 356/240; 250/223 B; 348/127
[58] Field of Search ..................... 356/240, 239, 356/237; 250/223 B; 348/125, 127; 382/142, 141

[56] References Cited

U.S. PATENT DOCUMENTS

| | | | |
|---|---|---|---|
| 4,435,641 | 3/1984 | Hajime | 356/240 |
| 4,758,084 | 7/1988 | Tokumi et al. | 356/240 |

*Primary Examiner*—Hoa Q. Pham
*Attorney, Agent, or Firm*—Robert C. Lyne, Jr.

[57] ABSTRACT

An inspection apparatus for measuring the flange of a can prior to forming the flange into a radially outward directed flange includes a light generating element for generating generally parallel light rays of a light beam along an axis and a refractor for receiving the parallel light rays and separating the light rays into a first light beam and a second light beam. The first light beam propagates generally along the axis into the can and is reflected within the can to produce a lighted image of the inside edge of the flange. The second light beam propagates at an angle relative to the axis to illuminate and produce a lighted image of the outside edge of the flange. A video camera generates image data from the lighted images, and a data processor interprets the image data. The refractor includes an outer cylindrical member and an inner cylindrical member disposed in a cavity extending through the outer cylindrical member. The inner cylindrical member includes a receiving opening at a first end thereof for receiving the light generating element, such as a fiber optic cable. The light rays enter the refractor at the receiving opening and are refracted upon entry. A first, preferable conical refractive surface is located at the end of the inner cylindrical member to refract the light rays to form the first light beam. A second, preferably concave, refracting surface is located on the end of the outer cylindrical member to refract the light rays to form the second light beam.

25 Claims, 5 Drawing Sheets

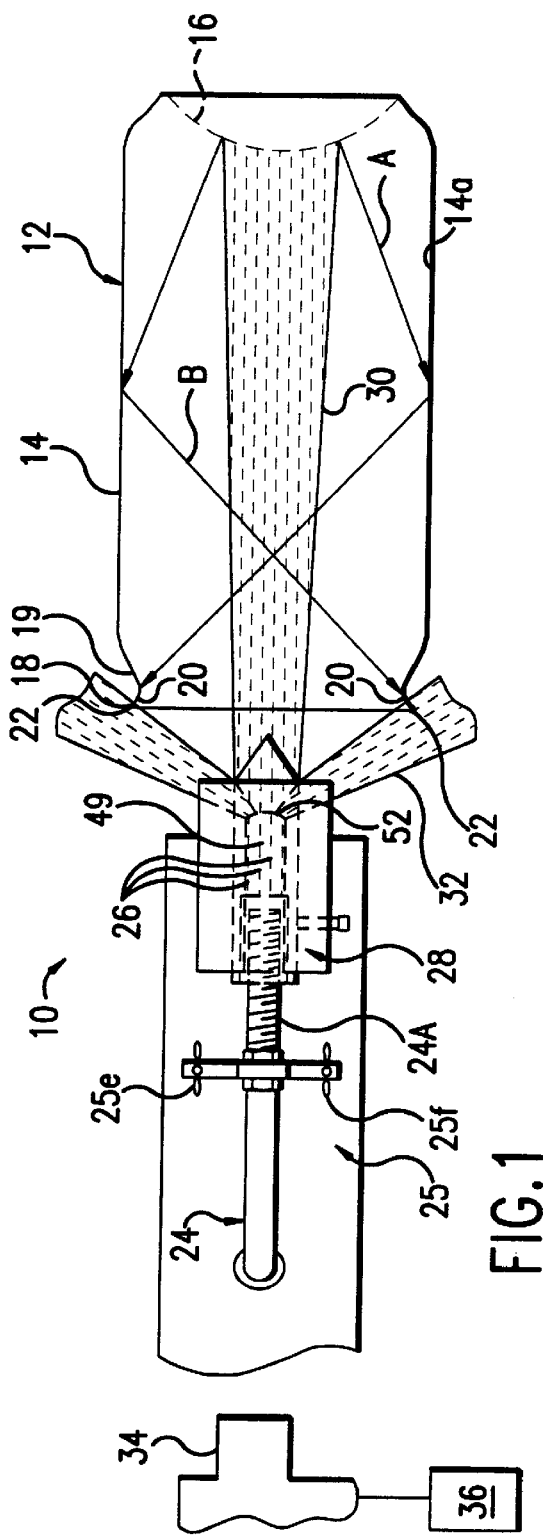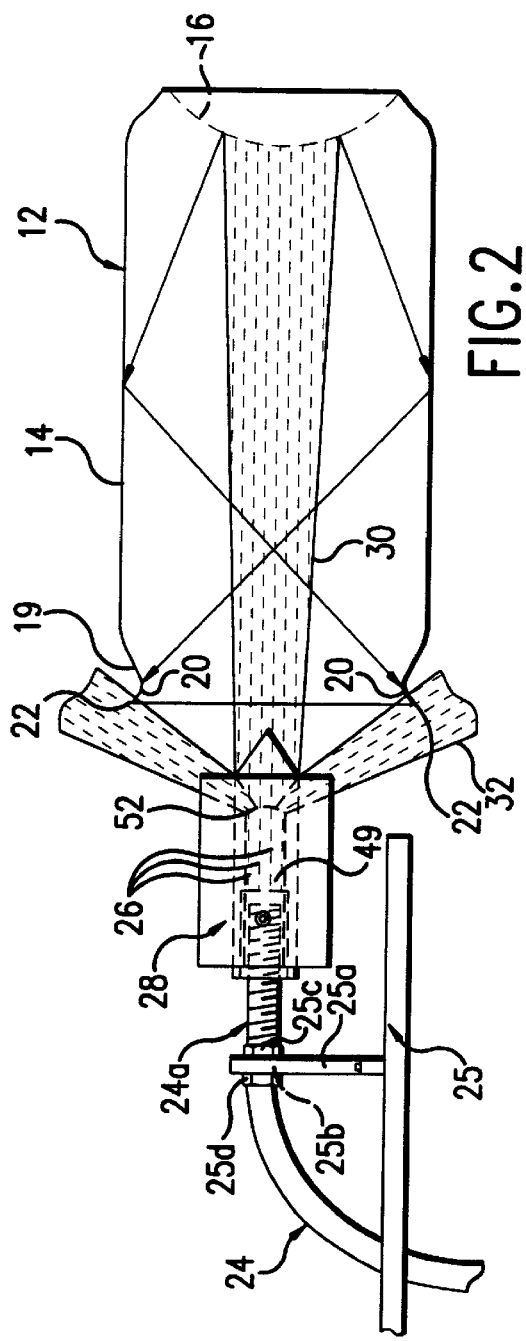

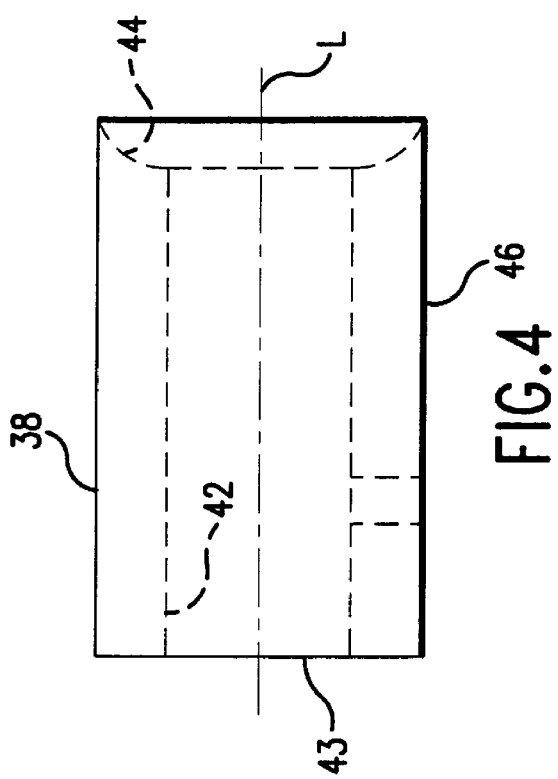
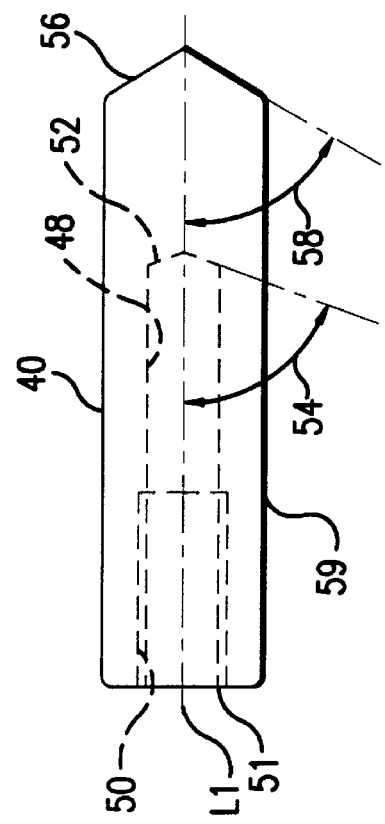
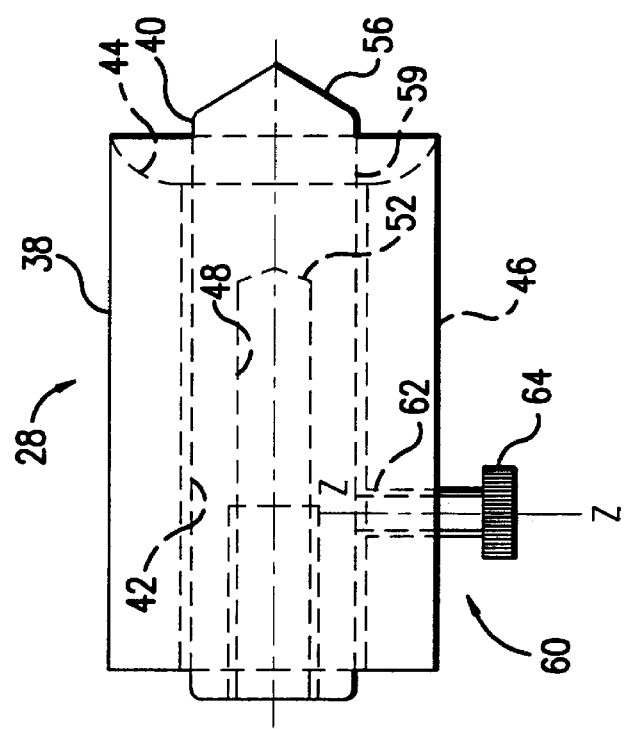

INSPECTION APPARATUS WITH REFRACTOR FOR ILLUMINATING CAN FLANGE

TECHNICAL FIELD

The present invention relates generally to an inspection apparatus for containers or cans for beverages such as soft drinks, beer and juices, manufactured in part by spin flow necking for forming the neck of the open end of can bodies.

BACKGROUND ART

Metal cans or containers, such as aluminum cans to contain beverages, are commonly manufactured by drawing and ironing (D&I) a circular metal blank into a cylindrical can body having a side wall and a bottom wall. Such cans are then fed into a necking and flanging apparatus by transfer or star wheels. Each can enters one of a number of stations in a necking turret undergoing rotational movement which is synchronous with the continued movement of the cans in the star wheel. During this rotational movement, the peripheral open edge portion of the can side wall is acted upon by annular die members or spin forming members to form a neck of reduced diameter at the open end of the can. The necked cans are then transferred via transfer wheels to a flanging turret where the open edge of the can is flanged into a radially outward directed flange suitable for later receiving a can end in a known manner. After the can is filled with a beverage, a can end or lid is sealed onto it by double-seaming. The arrangement of drawing and ironing machines for forming the can bodies, and machines containing necking and flanging turrets are well known in the art.

A number of inspection systems are commercially available for use with the apparatus of the type described above. Typically, such systems utilize a source of illumination for illuminating the object to be inspected, in this instance, a can, a camera for viewing the illuminated can and creating imaging data and a processing device for processing the imaging data. For instance, one commercially available system is the Pattern Processing Technologies (PPT) 400 VPC camera system and software. This system takes a picture of the flange of the can, imports the picture into the computer, and digitizes the image so that each pixel on the computer image has a defined gray level of between 0 (black) and 225 (white). The software program is set up to observe a transition in the levels of grey, which is then used for inspection purposes, or to measure the flange, or to look for contaminants or other flaws in the flange. Because it is actually the image of the flange which is measured, rather than the flange itself, the lighting of the flange is a critical aspect of the operation. The lighting has to fall evenly on the edges of the flange, keeping all other areas on the inside and outside of the can relatively dark.

It is preferable to inspect the can at various stages of processing. For instance, the dimension of the flange is critical in permitting the seaming of a can end or lid. Thus, it is desirable to inspect the flange both after the necking process and after the reforming process by which the edge of the can is flanged into a radially outward directed flange. After the reforming process, the flange is disposed perpendicularly to the longitudinal axis of the can. Thus, inspection of the flange at this point is not problematic. However, before the reforming process, the flange is disposed at an angle relative to the longitudinal axis of the can, thereby making conventional inspection systems and methods more troublesome. For instance, because the surface is angled, it is difficult to achieve proper illumination of the flange without lighting other parts of the can. To obtain accurate results, the lighting must fall evenly on both the inner and outer peripheral edges of the flange while keeping all areas of the inside and outside of the can relatively dark. Various commercial lighting components have been tried, such as ring lights and fiber optics; however, none of these lighting components achieves the desired results.

It is one object of the present invention to provide an improved inspection system for accurately inspecting and measuring the flange of a can after spin flow necking.

Another object of the invention is to provide an improved illuminating component for providing illumination of the proper areas of a can to be inspected.

Yet a further object is to provide an improved method for inspecting and measuring the flange of a can after spin flow necking.

DISCLOSURE OF THE INVENTION

These and other objects are achieved by the provision of a refractor and inspection apparatus according to the present invention.

According to the invention, an inspection apparatus is provided for measuring the flange of a can formed by spin flow necking. The apparatus comprises a light generating element for generating generally parallel light rays of a light beam propagated along an axis and a refractor for separating the light into a first light beam and a second light beam. The first light beam propagates generally along the axis into the can and is reflected within the can to produce a lighted image of an inside edge of the flange. The second light beam propagates at an angle relative to the axis to illuminate and produce a lighted image of an outside edge of the flange. The apparatus further includes a video camera for generating image data from the lighted images of the inside and outside edges of the flange and a data processor for interpreting the image data.

In a preferred embodiment, the data processor produces a value corresponding to the respective images of the inside and outside edges of the flange representative of the distance between the inside and outside edges of the flange.

In accordance with another embodiment of the invention, the refractor comprises an outer cylindrical member and an inner cylindrical member both disposed along a longitudinal axis. The outer cylindrical member includes an inner cylindrical coaxial cavity extending therethrough and a first refracting surface at one end thereof. The inner cylindrical member is disposed in the inner cylindrical cavity and is movable along the longitudinal axis of the outer cylindrical member. The inner cylindrical member includes a receiving opening at a first end thereof for receiving the light generating element and a second refracting surface at a second end thereof. The parallel light rays entering the first refracting surface diverge to form the first light beam, and the parallel light rays entering the second refracting surface diverge to form the second light beam. Preferably, the receiving opening has a conical surface at the forward end thereof. In a preferred embodiment, the conical surface is disposed approximately 67.5° relative to the longitudinal axis.

In accordance with another embodiment of the invention, the second refracting surface of the inner cylindrical member includes a conical surface. In a preferred embodiment, the conical surface of the refracting surface of the inner cylindrical member is disposed approximately 59° relative to the longitudinal axis.

In accordance with yet another aspect of this invention, the light generating element includes an externally threaded portion at a forward end thereof. A portion of the receiving opening is internally threaded to cooperate with the threaded portion of the light generating element.

According to a further embodiment of this invention, the first refracting surface of the outer cylindrical member is concave.

Another feature of this invention is that the inner member is secured relative to the outer member. Preferably, a tapped hole is radially disposed in the outer cylindrical member and a threaded screw is insertable in the tapped hole and is adapted to contact the inner member when tightened within the tapped hole. It is preferred that the threaded screw be a thumbscrew.

In another embodiment of the invention, the refractor comprises a body of light-propagating material defining a first light-refracting surface receiving the parallel light rays and causing divergence of the generally parallel light rays by refraction to form divergent light rays propagating within the body. A second light-refracting surface is provided receiving a first portion of the divergent light rays and causing further divergence of the portion of the divergent light rays by refraction to form the second angled light beam. The second light-refracting surface is disposed at an outer surface of the body. A second portion of the divergent light rays exiting from the first light-refracting surface not received by the second light-refracting surface forms the first light beam.

According to yet another embodiment, the refractor includes a receiving opening for receiving the parallel light rays, and the first light-refracting surface is disposed at the end of the receiving opening.

According to a further embodiment of the invention, the light generating element is secured to the refractor at the receiving opening. Preferably, the light generating element is threaded to the receiving opening.

It is preferred that the second angled light beam exits the body at the second light-refracting surface.

Preferably, the first light-refracting surface is conical, while the second light-refracting surface is concave.

According to another embodiment of the invention, the body further defines a third light-refracting surface on a portion of the outer surface of the body. The third light-refracting surface receives the second portion of the divergent light rays and causes further divergence of the second portion of the divergent light rays by refraction to form the first light beam. Preferably, the first light beam exits the body at the third light-refracting surface, and the third light-refracting surface is conical.

The invention also encompasses a method for measuring the flange of a can formed by spin flow necking. The method comprises the steps of generating parallel light rays of a light beam propagated along an axis and separating the light rays into a first light beam and a second light beam by refraction. Additionally, the method includes the steps of illuminating an inside edge of the flange by propagation of the first light beam generally along the axis into the can and reflection of the first light beam within the can and illuminating an outside edge of the flange by propagation of the second light beam at an angle relative to the axis. An image of the illuminated inside and outside edges of the flange is generated, whereupon the camera image is used to generating image data, which image data is interpreted to obtain a measurement.

According to a further embodiment, the step of separating the light rays into the first light beam and the second light beam by refraction comprises the steps of receiving the parallel light rays in a receiving opening disposed in a refractor, refracting a first portion of the parallel light rays upon exiting the refractor at a first refracting surface to form the first light beam, and refracting a second portion of the parallel light rays upon exiting the refractor at a second refracting surface to form the second light beam.

According to yet another embodiment, the step of separating the light rays into the first light beam and the second light beam by refraction comprises the steps of receiving the parallel light rays in a receiving opening disposed in a refractor, refracting the parallel light rays upon entry into the refractor to form divergent light rays propagating within the refractor, refracting a first portion of the parallel light rays upon exiting the refractor at a first refracting surface to form the first light beam, and refracting a second portion of the parallel light rays upon exiting the refractor at a second refracting surface to form the second light beam.

According to yet another aspect of the invention, a refractor is provided for separating a beam of light from a light generating element into a first refracted light beam and second refracted light beam. The refractor comprises an outer cylindrical member disposed along a longitudinal axis and including an inner cylindrical coaxial cavity extending therethrough and a first refracting surface at one end thereof. An inner cylindrical member is disposed in the inner cylindrical cavity and movable along the longitudinal axis of the outer cylindrical member. The inner member includes a receiving opening at a first end thereof for receiving the light generating element and a second refracting surface at a second end thereof. Light propagating from the light generating element enters the first refracting surface and diverges to form the first refracted light beam. Light propagating from the light generating element enters the second refracting surface and diverges to form the second refracted light beam.

Preferably, the receiving opening has a conical surface at the forward end thereof, and the refracting surface of the inner cylindrical member includes a conical surface.

According to a preferred embodiment, the light generating element includes an externally threaded portion at a forward end thereof. A portion of the receiving opening is internally threaded to cooperate with the threaded portion of the light generating element.

It is also preferred that the refracting surface of the inner cylinder includes a conical surface, and that the first refracting surface is concave.

According to another embodiment of the invention, a refractor is provided for receiving generally parallel light rays of a light beam propagated along an axis for redirecting the light rays to produce a first light beam propagating generally along the axis and a second outwardly angled light beam propagating at an angle relative to the axis. The refractor comprises a body of light-propagating material defining a first light-refracting surface receiving the parallel light rays and causing divergence of the generally parallel light rays by refraction to form divergent light rays propagating within the body. A second light-refracting surface receives a first portion of the divergent light rays and causes further divergence of the portion of the divergent light rays by refraction to form the second outwardly angled light beam. The second light-refracting surface is disposed at an outer surface of the body. A second portion of the divergent light rays exiting from the first light-refracting surface not received by the second light-refracting surface form the first light beam.

Preferably, the second outwardly angled light beam exits the body at the second light-refracting surface.

It is also preferred that the first light-refracting surface is conical and the second light-refracting surface is concave.

According to another preferred embodiment, the refractor body further defines a third light-refracting surface on a portion of the outer surface of the body. The third light-refracting surface receives the second portion of the divergent light rays and causes further divergence of the second portion of the divergent light rays by refraction to form the first light beam.

Preferably, the first light beam exits the body at the third light-refracting surface, and the third light-refracting surface is conical.

In another embodiment of the invention, a refractor is provided for receiving generally parallel light rays of a light beam propagated along an axis for redirecting the light rays to produce an angled light beam propagating at an angle relative to the axis. The refractor comprises a body of light-propagating material defining a first light-refracting surface receiving the parallel light rays and having a configuration adapted to cause divergence of the generally parallel light rays by refraction to form divergent light rays propagating within the body. A second light-refracting surface is provided to receive the divergent light rays. The second light-refracting surface has a configuration adapted to cause further divergence of the divergent light rays by refraction. The second light-refracting surface is disposed on an outer surface of the body. The configuration of the first light-refracting surface and the configuration of the second light-refracting surface are selected to redirect the generally parallel light rays into the angled light beam.

BRIEF DESCRIPTION OF THE DRAWINGS

FIG. 1 is a plan view of the inspection apparatus of the present invention;

FIG. 2 is an elevation view of the inspection apparatus of FIG. 1;

FIG. 3 is a side view of the refractor of the inspection apparatus of FIGS. 1 and 2;

FIG. 4 is a detail side view of the first element of the refractor of FIG. 3;

FIG. 5 is a detail side view of the second element of the refractor of FIG. 3;

BEST MODE FOR CARRYING OUT THE INVENTION

Figure 6:
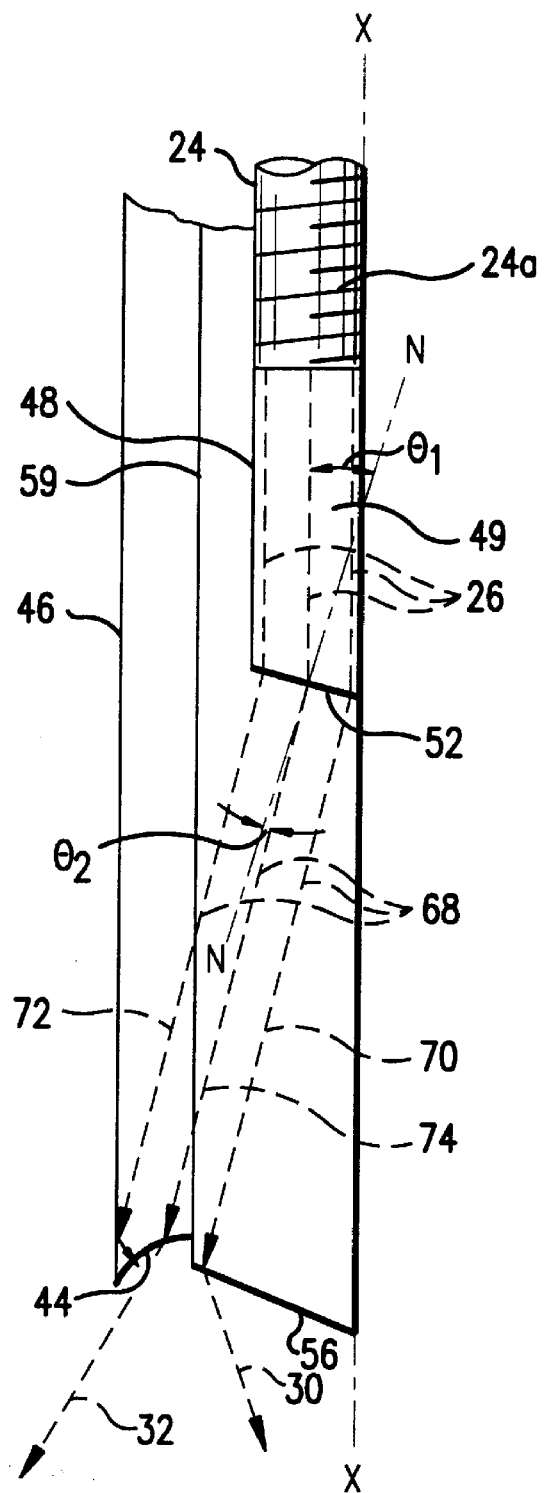
FIG. 6 is a schematic representation of the refraction of light within the refractor of FIGS. 3–5.

Referring to FIGS. 1 and 2, an inspection apparatus, shown generally as 10, is depicted for use on a can 12 preferably while being held onto a discharge turret (not shown) of a necking machine by vacuum. Can 12 generally includes a cylindrical side wall 14, a bottom wall 16 and a peripheral annular flange 18 formed at the open end of the side wall opposite the bottom wall. The annular flange 18 is formed as a result of necking in the open end of the side wall 14 to form a necked-in region of smaller diameter than the can side wall diameter, preferably but not necessarily with a process known as spin flow forming as disclosed, for example, in U.S. Pat. No. 4,781,047 under license to Reynolds Metals Company, Richmond, Virginia, the Assignee of the present invention. Flange 18 terminates in an outside circular edge 22 where it extends radially inwardly to join with a throat 19 that may be a straight or rectilinear cylinder of uniform diameter and which constitutes the smallest diameter of the necked-in region. Typically, the point at which the flange 18 joins with the throat 19 constitutes an inside circular edge 20 of the flange. It will be understood, however, that this circular inside edge 20 may be actually radially inwardly and axially rearwardly spaced from the flange proper but will nonetheless be deemed to be the inside edge of the flange for purposes of describing the present invention. As will be described hereinafter, inspection apparatus 10 is utilized to project light for precise illumination of both the inside and outside edges 20, 22 to facilitate accurate measurement of the flange 18 while still in a frusto conical form, i.e. prior to reforming so as to extend perpendicular to the can longitudinal axis such as at a flanging station as disclosed in U.S. Pat. No. 5,235,839, also assigned to Reynolds Metals, the Assignee of the present invention.

Inspection apparatus 10 allows for accurate measurement of the distance between flange inside edge 20 and flange outside edge 22. Inspection apparatus 10 generally includes a light generating element 24, preferably a fiber optics cable, emitting parallel light rays 26. Light generating element 24 is mounted to, for instance, a support plate 25 by means of a holder plate 25a including a hole 25b through which light generating element 24 is received. A pair of nuts 25c, 25d are disposed on either side of hole 25b and are tightened to secure light generating element 24 in place. A pair of slotted adjustment holes 25e, 25f are provided in support plate 25 for purposes as will be described herein.

Light generating element 24 is rigidly secured to a refractor 28 that separates parallel light rays 26 into a first generally axial light beam 30 and a second outwardly angled light beam 32. As seen in FIGS. 1 and 2, first axial light beam 30 is reflected off the bottom interior surface 16a (which may be convex or frustum shaped) of can bottom wall 16, whereupon it travels along path A to impinge on, and be and reflected off, the inside cylindrical surface 14a of side wall 14 for travel along path B to back light and illuminate flange inside edge 20. Also as seen in FIGS. 1 and 2 and as discussed more fully below, second outwardly angled light beam 32 illuminates flange outside edge 22.

Inspection apparatus 10 further includes a video camera 34 for receiving the lighted images of the flange inside edge 20 and flange outside edge 22. Video camera 34 generates image data from these lighted images. As will be later described in more detail, a data processor 36 interprets the image data generated by the video camera.

Referring to FIGS. 3 through 5, refractor 28 is depicted in detail. Refractor 28 includes an outer cylindrical member 38 and an inner cylindrical member 40. Both outer cylindrical member 38 and inner cylindrical member 40 are preferably made of a material manufactured by General Electric under the tradename LEXAN. Inner cylindrical member 40, depicted in detail in FIG. 5, is disposed about a longitudinal axis L1 and includes an outside cylindrical surface 59. Inner cylindrical member 40 includes a flat end 51 at one end thereof and terminates in a conical surface 56 at the other end thereof. Conical surface 56 is disposed at an angle 58 (relative to longitudinal axis L1) of preferably approximately 60°. At flat end 51, a receiving opening 48 is disposed coaxially with longitudinal axis L1 to receive light generating element 24 therein. Receiving opening 48 extends through only a portion of inner cylindrical member 40 and terminates at an internal conical refracting surface 52. Conical refracting surface 52 is disposed at an angle 54 relative to longitudinal axis Y—Y. Angle 58 preferably is about 67.5°.

To secure light generating element 24 and inner cylindrical member 40, receiving opening 48 includes an internally threaded portion 50. Light generating element 24 includes an externally threaded forward end 24a (depicted in FIGS. 1 and 2). By threading inner cylindrical member 40 onto threaded forward end 24a of light generating element 24, inner cylindrical member 40 is positioned and secured relative thereto. Preferably, light generating element 24 is disposed in receiving opening 48 such that a gap 49 (depicted in FIGS. 1 and 2) is created between the forward end 24a of light generating element 24 and conical refracting surface 52. Thus, when parallel light rays 26 are generated from light generating element 24, the light rays will travel in gap 49 before entering inner cylindrical member 40 at conical refracting surface 52. Upon entry, parallel light rays 26 are refracted by conical refracting surface 52, as best depicted in FIG. 6, to form divergent light rays 68. As can be appreciated by those familiar with the principles of optical refraction, because the density of inner cylindrical member 40 is greater than the density of air, parallel light rays 26 are refracted by conical refracting surface 52 in a direction toward the normal N—N of conical refracting surface 52. Thus, the angle of incidence $\theta_1$ of parallel light rays 26 entering conical refracting surface 52 is greater than the angle of refraction $\theta_2$ of divergent light rays 68 exiting from conical refracting surface 52. The resulting divergent light rays are thus "bent" away from longitudinal axis L1.

A first portion 70 of divergent light rays 68 propagate generally along longitudinal axis L1 of inner cylindrical member 40 toward refracting surface 56, whereupon first portion 70 of divergent light rays 68 is further refracted to produce first generally axial light beam 30 propagating generally along longitudinal axis L1 into can 12. Specifically, as portion 70 of divergent light rays 68 encounter and exit conical refracting surface 56, since the density of the refractor is less than the density of air, portion 70 is refracted in a direction away from the normal of conical refracting surface 56, i.e., the divergent light rays emanating from refracting surface 56 are "bent" toward longitudinal axis L1 to form first generally axial light beam 30.

Outer cylindrical member 38 is depicted in detail in FIG. 4 and includes a longitudinal axis L and an outside cylindrical surface 46. Outer cylindrical member 38 includes a flat end 43 at one end and a concave refracting surface 44 at the other end thereof. An inner cylindrical cavity 42 extends longitudinally through outer cylindrical member 38 along axis L and is open at opposite ends thereof. Inner cylindrical member 40 is adapted to be snugly received in inner cylindrical cavity 42 of outer cylindrical member 38.

Referring again to FIG. 6, a second portion 72 of divergent light rays 68 propagates within inner cylindrical member 40 and exits inner cylindrical member at outside cylindrical surface 59. Upon exiting inner cylindrical member 40, second portion 72 enters outside cylindrical member 38 at inner cylindrical cavity 42. Because both members 38 and 40 are made of the same material, no refraction of second portion 72 occurs on entry to outside cylindrical member 38. Second portion 72 propagates within outer cylindrical member 38 and exits at outside cylindrical surface 46. Second portion 72 intersects outside cylindrical surface 46 at an angle greater than the critical angle of incidence, so the rays of second portion 72 are reflected inside refractor 28.

A third portion 74 of divergent light rays 68 propagates within inner cylindrical member 40 and again exits inner cylindrical member at outside cylindrical surface 59. Upon exiting inner cylindrical member 40, second portion 72 enters outside cylindrical member 38 at inner cylindrical cavity 42. As with second portion 72, no refraction of second portion 72 occurs on entry to outside cylindrical member 38. Second portion 72 propagates within outer cylindrical member 38 and exits at concave refracting surface 44. As it exits concave refracting surface 44, third portion 74 is further refracted to form second outwardly angled light beam 32 propagating at an angle relative to the axis. Specifically, the combination of refracting surface 52 of inner cylindrical member 40 with concave refracting surface 46 of outer cylindrical member 38 create an effect similar to a diverting lens causing third portion 74 to diverge away from longitudinal axis L. As depicted in FIGS. 1 and 2, second outwardly angled light beam 32 thus formed intersects outside flange 22 of can 12 so as to illuminate outside flange 22.

When inner cylindrical member 40 is received in inner cylindrical cavity 42 of outer cylindrical member 38, inner cylindrical member 40 is moveable along longitudinal axis L of outer cylindrical member 38. This movement of inner cylindrical member 40 relative to outer cylindrical member 38 permits the light rays emanating from the refracting surfaces of refractor 28 to be focused so as to obtain clear lighted images of inside flange 20 and outside flange 22. Preferably, refractor 28 includes a securing means 60 enabling the inner cylindrical member 40 to be held in place relative to outer cylindrical member 38. For instance, securing means 60 could include a radially disposed tapped hole 62 disposed in outer cylindrical member 38. A threaded screw, preferably a thumb screw 64, is received within tapped hole 62 and contacts the outer surface of inner cylindrical member 40. Accordingly, it can be seen by one skilled in the art that tightening of thumb screw 64 within tapped hole 62 permits contact of thumb screw 64 with outer cylindrical surface 59 of inner cylindrical member 40, to restrict movement of inner cylindrical member 40 relative to outer cylindrical member 38.

An advantage of the two-piece refractor 28 is that the light emanating from the refractor, specifically, first generally axial light beam 30 and second outwardly angled light beam 32, can be focused by means of a variety of adjustments to the apparatus described herein. First, the position of light generating element 24 relative to can 12 can be adjusted by longitudinal adjustment of holder plate 25a relative to support plate 25 via slotted holes 25e, 25f. Additionally, the extent to which forward end 24a of light generating element 24 is threaded into internally threaded portion 50 of inner cylindrical member 40 affects the position of light generating element 24 relative to can 12.

Further adjustment of the light emanating from refractor is achieved by varying the position of inner cylindrical member 40 relative to outer cylindrical member 38. Because first generally axial light beam 30 illuminating inside edge 20 emanates from inner cylindrical member 40 while second outwardly angled light beam 32 illuminating outside edge 22 emanates from outer cylindrical member 38, the ring of light created at inside edge 20 of flange 18 can be focused separately from the ring of light created at outside edge 22 of flange 18 by varying the relative positions of members 38 and 40. Once the desired focusing of the rings of light is achieved, inner cylindrical member 40 is secured in position relative to outer cylindrical member 38 by tightening thumbscrew 64 so that thumbscrew 64 contacts outer cylindrical surface 59 of inner cylindrical member 40. It is expected that once the relative positions of member 38 and 40 are set in any given inspection apparatus during initial installation of the system, there is no need for further adjustment of the members.

Figure 7:
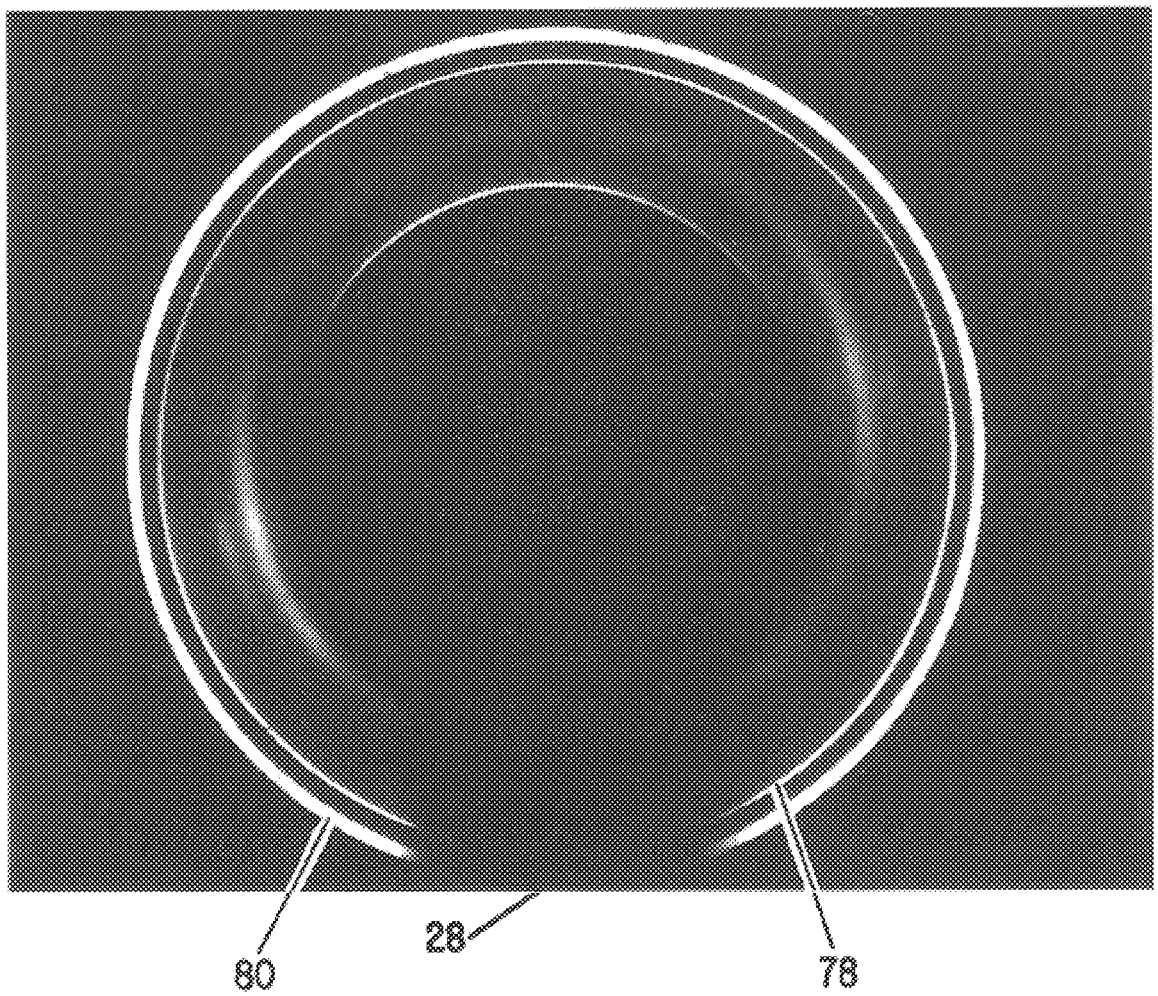
FIG. 7 is an example of an image produced by the refractor of FIGS. 3–5.

An example of the image formed by video camera 34 is depicted in FIG. 7. The dark portion appearing in the center of the image is the refractor 28. The inner ring 78 of light represents inside edge 20 of flange 18, while the outer ring 80 of light represents outside edge 22 of flange 18. Because the flange is angled relative to the lens of video camera 34, the image of FIG. 7 is a projected image of the inside and outside edges 20, 22 of flange 18 to the plane of the lens, rather than a true image of the flange. Thus, the data resulting from the image is not a true measurement of the flange width.

In FIG. 7, the refractor appears dark because the outer cylindrical member 38 of the refractor is enclosed on outside cylindrical surface 46 and flat end 43 by a 1" diameter rubber heat shrink tubing. The heat shrink tubing may optionally be used where it is desired to reduce the light emanating from outer cylindrical surface 46 and/or the overall level of light propagating back toward video camera 34.

Data processor 36 is a standard AT compatible computer including integrated circuit boards capable of digitizing and processing video images. The digitizing process converts the analog image signal into a digital form (.tif format) that breaks the image down into an array of pixels that have defined levels of light intensity ranging from 0 (black) to 225 (white). Preferably, data processor 36 includes built-in input/output modules for control purposes, a hard drive, a 3½" floppy drive, a parallel port, and two serial ports. Data processor 36 may be, for instance, a controller manufactured by Pattern Processing Technology (PPT) as Vision Process Controllers, either the 400VPC or the Passport 240.

Preferably, camera 34 is a camera manufactured by Panasonic and sold as Model GP-MF 702. A Dynapar encoder is mounted on the end of the turret shaft and provides the timing signal that is used to trigger the camera and strobe lighting. An EG&G MVS 2020 strobe light system is used to flash the light through light generating element 24, preferably, a fiber optic cable, and through refractor 28 to illuminate the can flange.

The PPT Vision systems use a proprietary image processing software called Vision Program Manager (VPM) that provides a means of developing an application specific program that runs in the Microsoft Windows environment. This software detects contrast (changes) in the light levels of the image. As described below, the program developed for inspection apparatus 10 measures six flange widths and two plus (inside of neck) diameters. These measurements, in numbers of pixels, are then sent out to memory buffers in the computer. Another program retrieves the measurements from the memory buffers, converts the pixel measurements to inches, and displays the data using charts and graphs so that the performance of the necking machine can be monitored.

Figure 8:
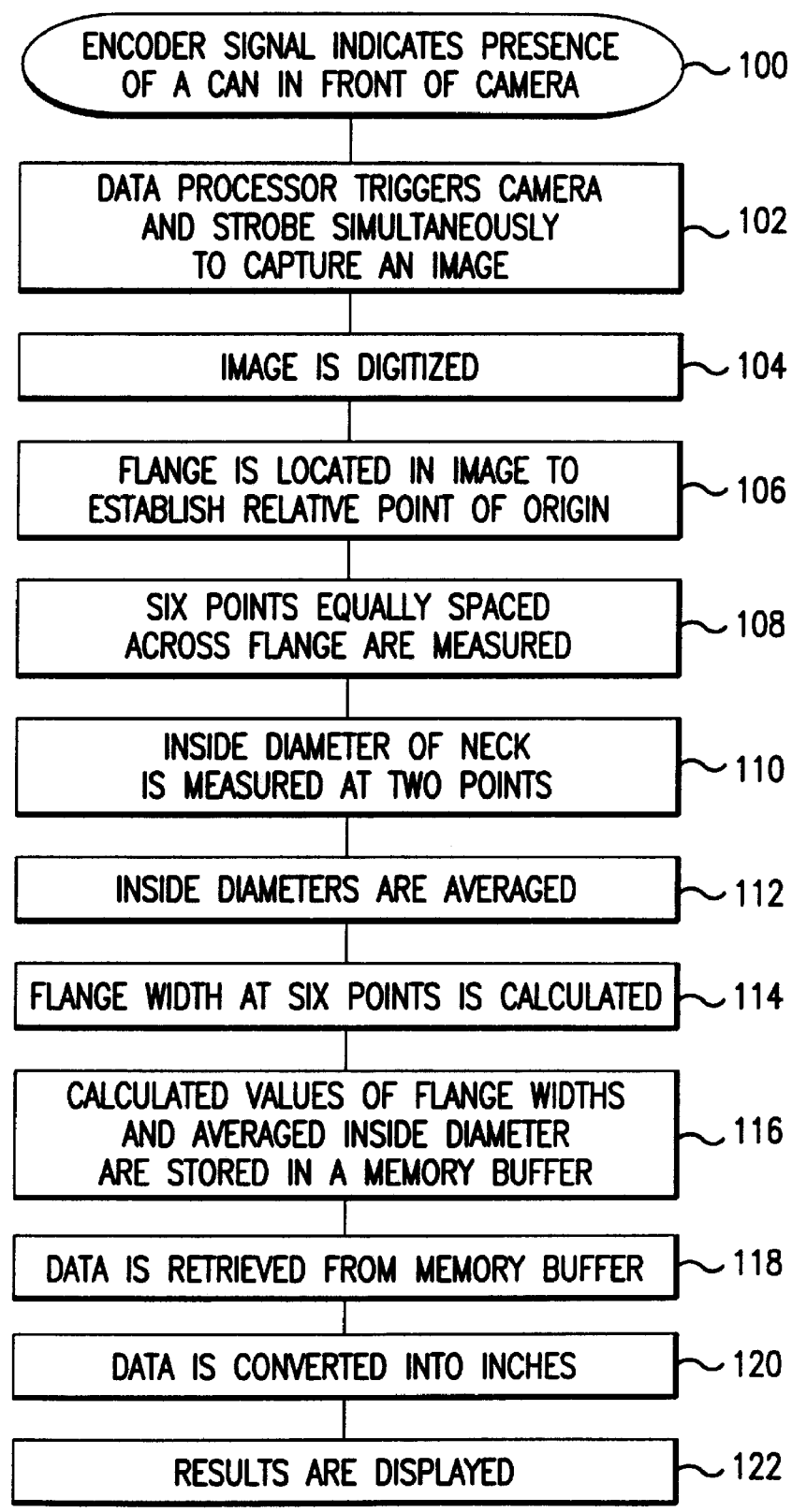
FIG. 8 is a flow chart of the data processor.

FIG. 8 is a basic flow chart for the processor control of the present invention. Processing begins at step 100 with the encoder signal indicating the presence of a can in front of camera 34. In step 102, data processor 36 triggers camera 34 and the strobe simultaneously to capture an image. The image is digitized in step 104. At step 106, the software program locates the can flange in the image so that it can establish a relative point of origin, whereupon processing continues to step 108 and the software measures six points generally equally distributed across the flange, the points preferably being located at approximately 60° from one another. At step 110, the inside diameter of the neck is measured at two points, the points preferably being located at approximately 90° from one another. The resulting inside diameters are averaged in step 112, while the flange width is calculated in step 114 for the six points measured in step 110. In step 116, the six calculated values of the flange widths and the averaged inside diameter are stored in a memory buffer, in units of pixels. The data is retrieved from the memory buffer in step 118 and is converted into inches in step 120. The results are displayed in step 122.

In practice, one such inspection apparatus 10 will be installed on each necking and flanging apparatus. Because the processing time for the computer to generate the necessary inspection data is relatively long in comparison with the output of the necking and flanging apparatus, it is contemplated that, for instance, only every thirteenth can will be inspected.

It is to be understood that the inspection system of the present invention is primarily suited for use with flanges which are angled relative to the longitudinal axis of the can. Thus, it is contemplated that the invention is used prior to flange reforming, that is, prior to forming the flange into a radially outward directed flange. This invention can be used with flanges formed by other necking in processes, other than spin flow forming, so long as the necking in process results in a flange having the aforementioned characteristics.

In will be readily seen by one of ordinary skill in the art that the present invention fulfills all of the objects set forth above. After reading the foregoing specification, one of ordinary skill will be able to effect various changes, substitutions of equivalents, and various other aspects of the invention as broadly disclosed herein. It is therefore intended that the projection granted hereon be limited only by the definitions contained in the appended claims and equivalents thereof.

What is claimed is:

1. An inspection apparatus for measuring a flange on a can including a cylindrical side wall, a bottom wall, and a necked-in portion, the flange being formed at an open end of the side wall opposite the bottom wall adjacent the necked-in portion, the apparatus comprising:

a light generating element for generating generally parallel light rays of a light beam propagated along an axis;

a refractor for separating the light into a first light beam and a second light beam, the first light beam propagating generally along the axis into the can and being reflected within the can to produce a lighted image of an inside edge of the flange, the second light beam propagating at an angle relative to the axis to illuminate and produce a lighted image of the outside edge of the flange, a video camera for generating image data from the lighted images of the inside and outside edges of the flange; and a data processor for interpreting the image data.

2. An inspection apparatus according to claim 1, wherein the data processor produces a value corresponding to the respective images of the inside and outside edges of the flange representative of a distance between the inside and outside edges of the flange.

3. An inspection apparatus according to claim 1, wherein the refractor comprises:

an outer cylindrical member disposed along a longitudinal axis and including an inner cylindrical coaxial cavity extending therethrough and a first refracting surface at one end thereof, and an inner cylindrical member disposed in the inner cylindrical cavity and movable along the longitudinal axis of the outer cylindrical member, the inner member including a receiving opening at a first end thereof for receiving the light generating element and a second refracting surface at a second end thereof, wherein the parallel light rays entering the first refracting surface diverge to form the first light beam, and wherein the parallel light rays entering the second refracting surface diverge to form the second light beam.

4. An inspection apparatus according to claim 3, wherein the receiving opening has a conical refracting surface at the forward end thereof.

5. An inspection apparatus according to claim 4, wherein the conical refracting surface is disposed approximately 67.5° relative to the longitudinal axis.

6. An inspection apparatus according to claim 3, wherein the second refracting surface of the inner cylindrical member includes a conical surface.

7. An inspection apparatus according to claim 6, wherein the conical surface is disposed approximately 60° relative to the longitudinal axis.

8. An inspection apparatus according to claim 3, wherein the light generating element includes an externally threaded portion at a forward end thereof, and wherein a portion of the receiving opening is internally threaded to cooperate with and receive in threaded engagement the threaded portion of the light generating element.

9. An inspection apparatus according to claim 3, wherein the first refracting surface is concave.

10. An inspection apparatus according to claim 3, further comprising means for securing the inner member relative to the outer member.

11. An inspection apparatus according to claim 10, wherein the securing means comprises a tapped hole radially disposed in the outer member and a threaded screw insertable in the tapped hole and adapted to contact the inner member when tightened within the tapped hole.

12. An inspection apparatus according to claim 11, wherein the threaded screw is a thumbscrew.

13. An inspection apparatus according to claim 1, wherein the refractor comprises a body of light-propagating material defining:
   a first light-refracting surface receiving the parallel light rays and causing divergence of the generally parallel light rays by refraction to form divergent light rays propagating within the body; and
   a second light-refracting surface receiving a first portion of the divergent light rays and causing further divergence of the first portion of the divergent light rays by refraction to form the second outwardly angled light beam, the second light-refracting surface being disposed at an outer surface of the body,
   wherein a second portion of the divergent light rays exiting from the first light-refracting surface not received by the second light-refracting surface form the first light beam.

14. An inspection apparatus according to claim 13, wherein the refractor includes a receiving opening for receiving the parallel light rays, the first light-refracting surface being disposed at the end of the receiving opening.

15. An inspection apparatus according to claim 14, wherein the light generating element is secured to the refractor at the receiving opening.

16. An inspection apparatus according to claim 14, wherein the light generating element is threaded to the receiving opening.

17. An inspection apparatus according to claim 13, wherein the second outwardly angled light beam exits the body at the second light-refracting surface.

18. An inspection apparatus according to claim 13, wherein the first light-refracting surface is conical.

19. An inspection apparatus according to claim 13, wherein the second light-refracting surface is concave.

20. An inspection apparatus according to claim 13, wherein the body further defines a third light-refracting surface on a portion of the outer surface of the body, the third light-refracting surface receiving the second portion of the divergent light rays and causing further divergence of the second portion of the divergent light rays by refraction to form the first light beam.

21. An inspection apparatus according to claim 20, wherein the first light beam exits the body at the third light-refracting surface.

22. An inspection apparatus according to claim 21, wherein the third light-refracting surface is conical.

23. A method for measuring the flange of a can prior to forming the flange into a radially outward directed flange, the method comprising the steps of:
   generating parallel light rays of a light beam propagated along an axis;
   separating the light rays into a first light beam and a second light beam by refraction,
   illuminating an inside edge of the flange by propagation of the first light beam generally along the axis into the can and reflection of the first light beam within the can,
   illuminating an outside edge of the flange by propagation of the second light beam at an angle relative to the axis,
   generating an image of the illuminated inside and outside edges of the flange,
   generating image data from the camera image, and
   interpreting the image data to obtain a measurement.

24. A method according to claim 23, wherein the step of separating the light rays into the first light beam and the second light beam by refraction comprises:
   receiving the parallel light rays in a receiving opening disposed in a refractor;
   refracting a first portion of the parallel light rays upon exiting the refractor at a first refracting surface to form the first light beam; and
   refracting a second portion of the parallel light rays upon exiting the refractor at a second refracting surface to form the second light beam.

25. A method according to claim 24, wherein the step of separating the light rays into the first light beam and the second light beam by refraction comprises:
   receiving the parallel light rays in a receiving opening disposed in a refractor;
   refracting the parallel light rays upon entry into the refractor to form divergent light rays propagating within the refractor;
   refracting a first portion of the parallel light rays upon exiting the refractor at a first refracting surface to form the first light beam; and
   refracting a second portion of the parallel light rays upon exiting the refractor at a second refracting surface to form the second light beam.

* * * * *